(12) United States Patent
Anderson et al.

(10) Patent No.: US 7,655,211 B2
(45) Date of Patent: Feb. 2, 2010

(54) PROCESS FOR PRODUCING AMMONIUM THIOSULFATE

(75) Inventors: Mark C. Anderson, Spring, TX (US); Michael F. Ray, Spring Branch, TX (US); Ronald Shafer, Overland Park, KS (US)

(73) Assignee: ThioSolv, LLC, Spring Branch, TX (US)

( * ) Notice: Subject to any disclaimer, the term of this patent is extended or adjusted under 35 U.S.C. 154(b) by 110 days.

(21) Appl. No.: 11/894,948

(22) Filed: Aug. 22, 2007

(65) Prior Publication Data

US 2008/0050302 A1 Feb. 28, 2008

Related U.S. Application Data

(60) Provisional application No. 60/839,498, filed on Aug. 23, 2006.

(51) Int. Cl.
*C01B 17/64* (2006.01)
*C01B 21/20* (2006.01)
*C01G 3/14* (2006.01)

(52) U.S. Cl. ................. 423/514; 423/32; 423/388

(58) Field of Classification Search .............. None
See application file for complete search history.

(56) References Cited

U.S. PATENT DOCUMENTS

| | | | |
|---|---|---|---|
| 1,079,291 A | 11/1913 | Feld | |
| 2,898,190 A | 8/1959 | Grosskinsky et al. | |
| 3,431,070 A * | 3/1969 | Keller | ............ 423/514 |
| 3,524,724 A | 8/1970 | Every et al. | |
| 3,584,042 A | 6/1971 | Yavorsky et al. | |
| 3,627,465 A | 12/1971 | Hamblin | |
| 3,635,820 A | 1/1972 | Urban | |
| 4,008,310 A | 2/1977 | Gorin | |
| 4,478,807 A | 10/1984 | Ott | |
| 4,579,727 A | 4/1986 | Cronkright et al. | |
| 5,618,658 A | 4/1997 | Penman et al. | |
| 6,159,440 A | 12/2000 | Schoubye | |
| 6,534,030 B2 | 3/2003 | Anderson et al. | |
| 6,818,194 B2 | 11/2004 | DeBerry et al. | |
| 7,052,669 B2 | 5/2006 | Schoubye et al. | |
| 2003/0039606 A1* | 2/2003 | Schoubye et al. | ............ 423/514 |
| 2003/0072707 A1 | 4/2003 | Ray et al. | |
| 2003/0223930 A1 | 12/2003 | Schoubye et al. | |
| 2005/0002852 A1* | 1/2005 | Karras et al. | ............ 423/514 |
| 2006/0078491 A1* | 4/2006 | Lynn | ............ 423/574.2 |

FOREIGN PATENT DOCUMENTS

| | | |
|---|---|---|
| JP | 411263605 A | 9/1999 |
| JP | 02004161603 A | 6/2004 |

* cited by examiner

*Primary Examiner*—Melvin C Mayes
*Assistant Examiner*—Sheng Han
(74) *Attorney, Agent, or Firm*—D'Ambrosio & Associates, PLLC; Jo Katherine D'Ambrosio

(57) ABSTRACT

Process for the production of ammonium thiosulfate from gas streams comprising ammonia and hydrogen sulfide. One embodiment of the invention provides absorbing $SO_2$ into a solution of ammonium sulfite and then contacting gaseous feed streams with portions of the resulting solution in a plurality of contact zones where portions of ammonium sulfite in the liquid streams are converted to ammonium thiosulfate upon contact with the gaseous feed streams.

25 Claims, 4 Drawing Sheets

PROCESS FOR PRODUCING AMMONIUM THIOSULFATE

CROSS-REFERENCE TO RELATED APPLICATIONS

This application claims benefit of U.S. Provisional Patent Application Ser. No. 60/839,498, filed Aug. 23, 2006, entitled "Process for Producing Ammonium Thiosulfate and Oxidizing Sulfur Compounds" which is herein incorporated by reference.

FIELD OF THE INVENTION

This invention relates to a process for production of ammonium thiosulfate from gas streams comprising ammonia and hydrogen sulfide.

BACKGROUND

Ammonia ($NH_3$) and hydrogen sulfide ($H_2S$) are frequently found together in by-product mixtures from petroleum refining processes such as hydrotreating, cracking, and coking, as well as in ore reduction, metal refining, paper production, and gasification of coal, coke, residual oils, and the like.

When $NH_3$ and $H_2S$ are found in aqueous liquid streams, a sour water stripper is often employed to remove the $NH_3$ and $H_2S$ from the water, producing a gaseous stream of $H_2S$ and $NH_3$, which must be treated. In the past, $NH_3$ and $H_2S$ by-products were incinerated or burned as fuel. However, combustion results in the formation of nitrogen and sulfur oxides which are corrosive and contribute to atmospheric pollution.

One method of processing gas streams containing a mixture of $H_2S$ and $NH_3$ is to convert the $H_2S$ and $NH_3$ into ammonium thiosulfate (ATS), $(NH_4)_2S_2O_3$. ATS is a commercially marketable product which can be sold to offset the costs of treating $NH_3$ and $H_2S$.

In a previous process for converting $NH_3$ and $H_2S$ to ATS, a gaseous stream comprising $NH_3$ and $H_2S$ was fed to a first contact zone in which it was contacted with a solution of ATS and ammonium sulfite. A second part of the solution is fed in parallel to a second contact zone wherein it absorbs $SO_2$ from a second gas stream. In this formation, the contact zones were operated independently so that the first absorbed ammonia while selectively rejecting some $H_2S$. The other contact zone absorbed $SO_2$. However, this process requires high liquid rates, which reduce the energy and cost efficiency of the process.

ATS production processes can also produce elemental sulfur as a by-product. Elemental sulfur precipitates from an aqueous solution and must be removed from the system and disposed of, increasing the costs of treating the gas stream. The sulfur produced as elemental sulfur also reduces the amount of sulfur available for ATS production.

Consequently, there is a need for an efficient process of producing ammonium thiosulfate utilizing waste ammonia without the production of elemental sulfur.

SUMMARY

The embodiments of the present invention generally provide a process for the production of ammonium thiosulfate from gas streams comprising ammonia and hydrogen sulfide.

One embodiment of the invention provides a process for producing ammonium thiosulfate which includes contacting in a first contact zone a first gaseous feed stream with a first liquid stream. The first gaseous feed stream may include ammonia and hydrogen sulfide and the first liquid stream may include ammonium thiosulfate and ammonium sulfite. At least a portion of the ammonium sulfite is converted to ammonium thiosulfate upon contact with the first gaseous feed stream. The first contact zone produces a first contact zone effluent liquid stream and a first contact zone overhead gas stream. The first contact zone effluent liquid stream includes ammonium thiosulfate, and the first contact zone overhead gas stream includes hydrogen sulfide and ammonia. In a second contact zone, a second gaseous feed stream contacted with a second liquid stream. The second gaseous feed stream includes ammonia and hydrogen sulfide, and the second liquid stream includes ammonium thiosulfate and ammonium sulfite. At least a portion of the ammonium sulfite is converted to ammonium thiosulfate upon contact with the second gaseous feed stream. The second contact zone produces a second contact zone effluent liquid stream and a second contact zone overhead gas stream. The second contact zone overhead gas stream may include hydrogen sulfide, and the second contact zone effluent liquid stream may include ammonium thiosulfate and ammonium sulfite. A first portion of the first contact zone effluent liquid stream is removed to form a product liquid stream, and the second contact zone effluent liquid stream is combined with a second portion of the first contact zone effluent liquid stream to produce a third liquid stream. In a third contact zone, the third liquid stream is contacted with a third gaseous feed stream comprising sulfur dioxide, and at least a portion of the sulfur dioxide is converted to ammonium sulfite upon the contact with the third liquid stream. The third contact zone produces a third contact zone effluent liquid stream and a third contact zone overhead gas stream. The third contact zone effluent liquid stream may include ammonium thiosulfate and ammonium sulfite. A first portion of the third contact zone effluent liquid stream is fed to the first contact zone as the first liquid stream, and a second portion of the third contact zone effluent liquid stream is fed to the second contact zone as the second liquid stream.

One embodiment further provides modulating the flow rate of the first liquid stream to control the concentration of sulfite ions in the third liquid stream.

Another embodiment of the invention provides that in the second contact zone, at least a portion of the first contact zone overhead gas stream is contacted with the second liquid stream.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

The reactions involved in the process take place in water solution between ionic species, so it is to be understood that the terms ammonium, sulfite, bisulfite, and thiosulfate refer to ions in solution unless specific exception is made. In the following, "sulfite" is to be understood to refer to both sulfite ($SO_3^{2-}$) and bisulfite ($HSO_3^-$) unless the distinction is made explicitly.

Hydrogen sulfide ($H_2S$) and ammonia ($NH_3$) react with sulfur dioxide and water to produce ammonium thiosulfate (($NH_4)_2S_2O_3$) according to the following overall equation:

$$6NH_3 + 4SO_2 + 2H_2S + H_2O \rightarrow 3 \ (NH_4)_2S_2O_3$$

In one embodiment of a process to produce ATS, a gas stream comprising both $H_2S$ and $NH_3$ is contacted with an aqueous solution comprising sulfite ions. The sulfite ions are produced by dissolving $SO_2$ gas in aqueous ammonia, forming an aqueous solution. Contacting gaseous hydrogen sulfide with the sulfite solution dissolves the ammonia and hydrogen sulfide, which then reacts with the sulfite ions to produce ATS according to the following reaction:

$$6NH_4^+ + 2H_2S + 2HSO_3^- + 2SO_3^{2-} \rightarrow 3 \ (NH_4)_2S_2O_3 + 3H_2O$$

The ammonia dissolves in the sulfite solution according to the reaction:

$$NH_3 + HSO_3^- \rightarrow SO_3^{2-} + NH_4^+$$

In a process according to an embodiment of the invention, a stream of sulfite solution is produced in a third contact zone and split between a first contact zone and a second contact zone. A first gaseous stream comprising hydrogen sulfide and ammonia contacts the solution in the first contact zone, converting essentially all of the sulfite to ATS. A second gas stream also comprising $NH_3$ and $H_2S$ is fed to the second contact zone where the solution absorbs the ammonia and enough of the hydrogen sulfide to convert part of the sulfite to thiosulfate. Splitting the aqueous solution between the first and second contact zones allows the first contact zone to be operated at conditions which optimize ammonium thiosulfate production while the second contact zone is operated at conditions under which essentially all ammonia is absorbed from the feed gas while the absorption of $H_2S$ is limited.

In the various embodiments of the invention, the term "contact zone" refers to any equipment or combination of equipment known in the art wherein a liquid and gas or two immiscible liquids may contact each other. Examples of suitable equipment include, but are not limited to, packed towers, trayed towers, and venturi scrubbers. The term contact zone also includes any equipment used to facilitate the process, including pumps, valves, heat exchangers, and process control equipment.

Figure 1A:
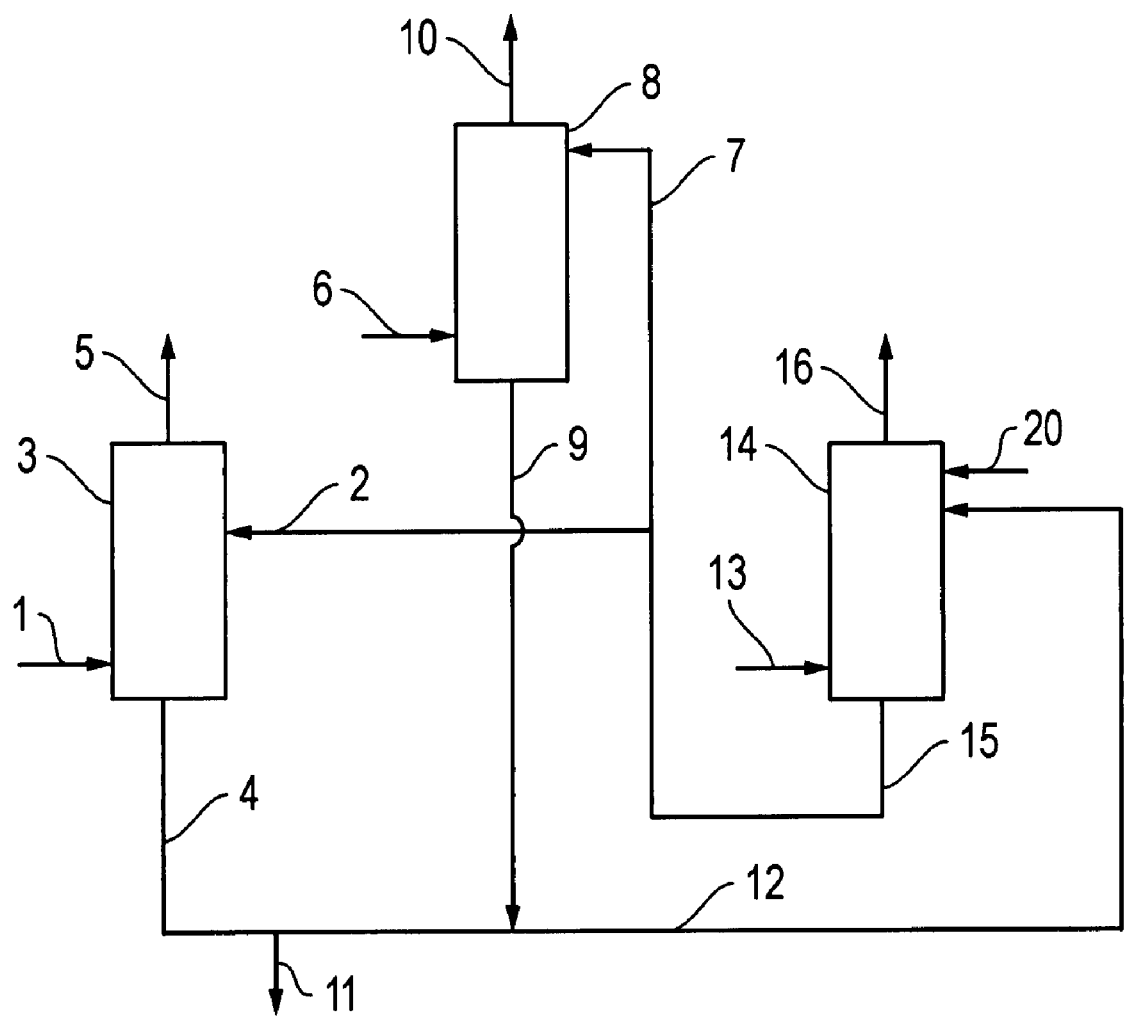
FIG. 1A is a block diagram for the process of production of ammonium thiosulfate, according to an embodiment of the invention.

FIG. 1 shows a first embodiment of the process for producing ammonium thiosulfate. The process comprises contacting a first gaseous feed steam 1 with a first liquid stream 2 in a first contact zone 3. The first gaseous feed stream 1 is comprised of ammonia and hydrogen sulfide. The first liquid stream 2 is a solution comprised of ammonium thiosulfate and ammonium sulfite. In the first contact zone 3, a portion of the ammonia in the first gaseous stream 1 is absorbed to form ammonium ions. A portion of the hydrogen sulfide is also absorbed and reacts with sulfite and bisulfite to form thiosulfate.

The first contact zone 3 produces a first contact zone effluent liquid stream 4 and a first contact zone overhead gas stream 5. The first contact zone effluent liquid stream 4 comprises ammonium thiosulfate. The first contact zone overhead gas stream 5 comprises hydrogen sulfide and ammonia.

A second gaseous feed stream 6 is contacted with a second liquid stream 7 in a second contact zone 8. The second gaseous feed stream 6 comprises ammonia and hydrogen sulfide. The second liquid stream 7 comprises ammonium thiosulfate and ammonium sulfite.

In the second contact zone 8, the ammonia in the second gaseous feed stream 6 is absorbed to form ammonium ions. A portion of the hydrogen sulfide is also absorbed to convert sulfite and bisulfite to thiosulfate.

The second contact zone 8 produces a second contact zone effluent liquid stream 9 and a second contact zone overhead gas stream 10. The second contact zone overhead gas stream 10 comprises hydrogen sulfide. The second contact zone effluent liquid stream 9 comprising ammonium thiosulfate, and ammonium sulfite.

The first contact zone effluent liquid stream 4 may be divided into a first portion and a second portion. Ammonium thiosulfate product is obtained from the process as the first portion to form a product liquid stream 11. The second portion is combined with the second contact zone effluent liquid stream 9 to produce a third liquid stream 12.

The third liquid stream 12 is contacted with a third gaseous feed stream 13 in a third contact zone 14. The third gaseous feed stream 13 comprises sulfur dioxide. In the third contact zone, sulfur dioxide is absorbed to react with the absorbed ammonia to form ammonium sulfite. The third contact zone 14 produces a third contact zone effluent liquid stream 15 and a third contact zone overhead gas stream 16. The third contact zone effluent liquid stream 15 comprises ammonium thiosulfate and ammonium sulfite.

In one embodiment, the third contact zone effluent liquid stream 15 is divided between the first contact zone 3 and the second contact zone 8. A first portion of the third contact zone effluent liquid stream 15 is fed to the first contact zone 3 as the first liquid stream 2. A second portion of the third contact zone effluent liquid stream 15 is fed to the second contact zone 8 as the second liquid stream 7.

The first gaseous stream 1 may be supplied from any suitable source. In one embodiment, the first gaseous feed stream 1 may be supplied from a sour water stripper. The third gaseous feed stream 13 may comprise the tail gas of a Claus process.

Figure 2:
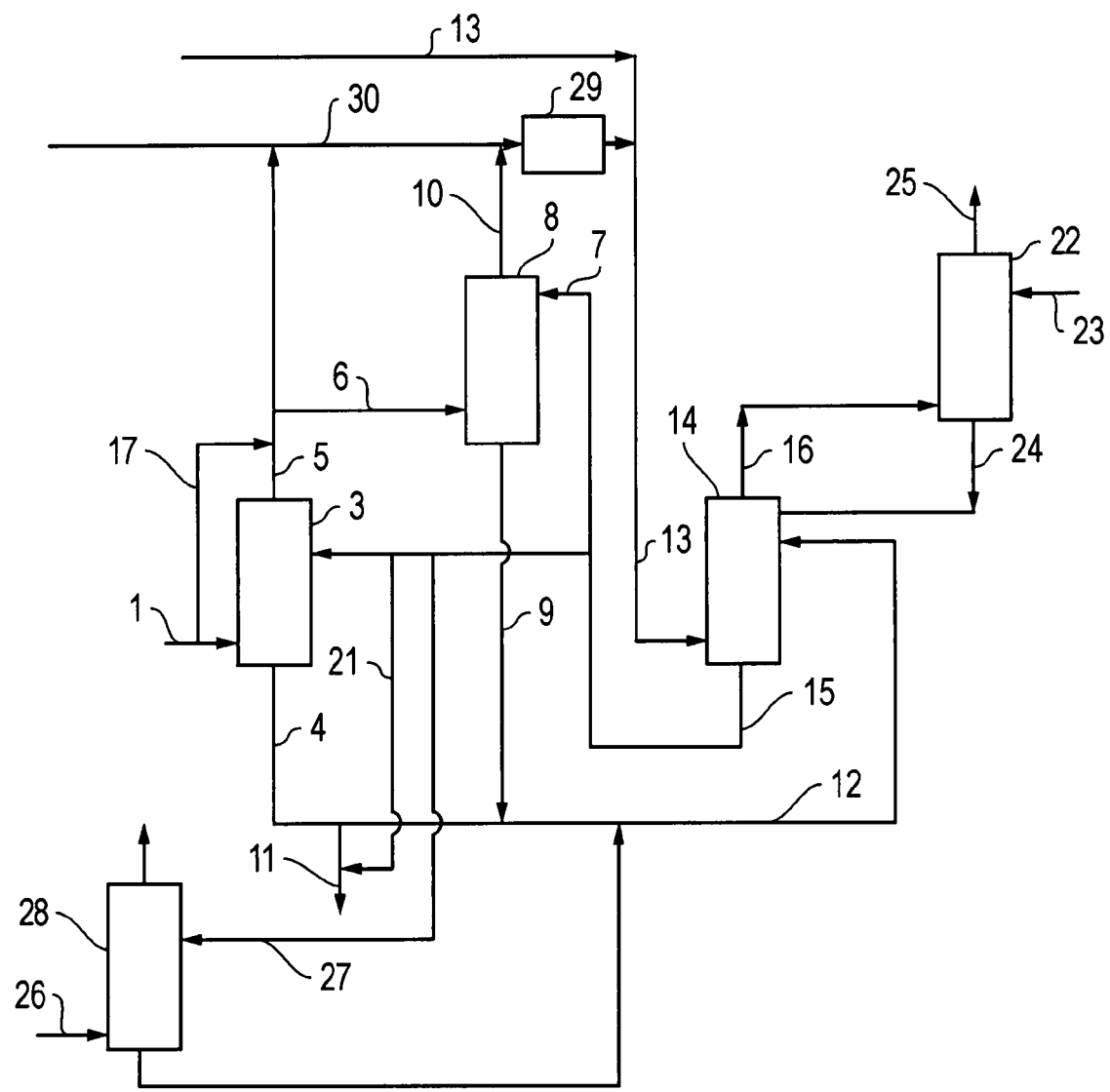
FIG. 2 is a block diagram for the process of production of ammonium thiosulfate, according to an embodiment of the invention.

Referring now to FIG. 2, in an alternative embodiment, the second gaseous feed stream 6 may comprise at least a portion of the first contact zone overhead gas stream 5. The second gaseous feed stream 6 may include all or part of the first contact zone overhead gas stream 5 from which some of the ammonia and some of the hydrogen sulfide were removed by the first contact zone 3.

Referring again to FIG. 1, in the process according to an embodiment of the invention, the sulfite ion/bisulfite ion containing liquid of the third contact zone effluent liquid stream 15 is divided to contact the hydrogen sulfide/ammonia—containing the first gaseous stream 1 and the second gaseous stream 6 independently. The effluent liquid streams 4 and 9 from both the first contact zone 3 and the second contact zone 6 are returned to the third contact zone 14. Neither effluent is reused in another contact zone to absorb ammonia or hydrogen sulfide before returning to the third contact zone. Therefore, the conditions in the first and second contact zones 3 and 8 may be controlled independently so that the product liquid stream 11 may be chemically reduced to thiosulfate leaving little or no concentration of sulfite ion present while leaving sufficient concentration of sulfite in the liquid effluent stream 9 from the second contact zone as a buffer to keep the pH low enough to dissolve the ammonia from the second gaseous feed stream.

Commercial specifications for ATS product restrict the concentration of sulfite that may be present and prohibit $H_2S$. The intensity of gas-liquid contact in the first contact zone may be adjusted to leave little or no sulfite in the liquid effluent, producing a high-quality product. If any sulfite is present, no sulfide can exist in the solution. If essentially all of the sulfite ions in the first liquid stream are reduced to thiosulfate ions, the buffering action of the sulfite ions is eliminated, without which the solubility of ammonia is low and the solution absorbs only slightly more ammonia than the stoichiometric 2:1 ratio to thiosulfate ions. Once the sulfite ions are completely depleted, dissolved $H_2S$ is no longer converted to thiosulfate and is therefore only slightly soluble. As a result, even when the sulfite in the solution is completely reduced to thiosulfate, the solution can contain at most very low concentration of ammonia and $H_2S$.

In the second contact zone, despite the presence of an excess of sulfite ion, the flow rate and pH of the second liquid stream 7 and the extent of contact in the second contact zone 8 are controlled to limit the amount of $H_2S$ absorbed to less than about 70% of the total amount of $H_2S$ required by the stoichiometry of the reaction. The total amount of $H_2S$ absorbed in the first and second contact zones 3 and 8 is controlled to an amount required by the stoichiometry of the reaction by modulating the flow rate of the first liquid stream 2 in response to the sulfite concentration of the third liquid stream 7. The sulfite concentration of the third liquid stream 7 may be measured by various means, including an oxidation potential analyzer or an infrared analyzer. An unexpected behavior of the process is that the relative absorption of $H_2S$ and $SO_2$ required by the stoichiometry is to some extent self-balancing because the amount of $H_2S$ absorbed in the second contact zone increases as the amount of sulfite increases in the liquid steam it contacts in the second contact zone.

Figure 1B:
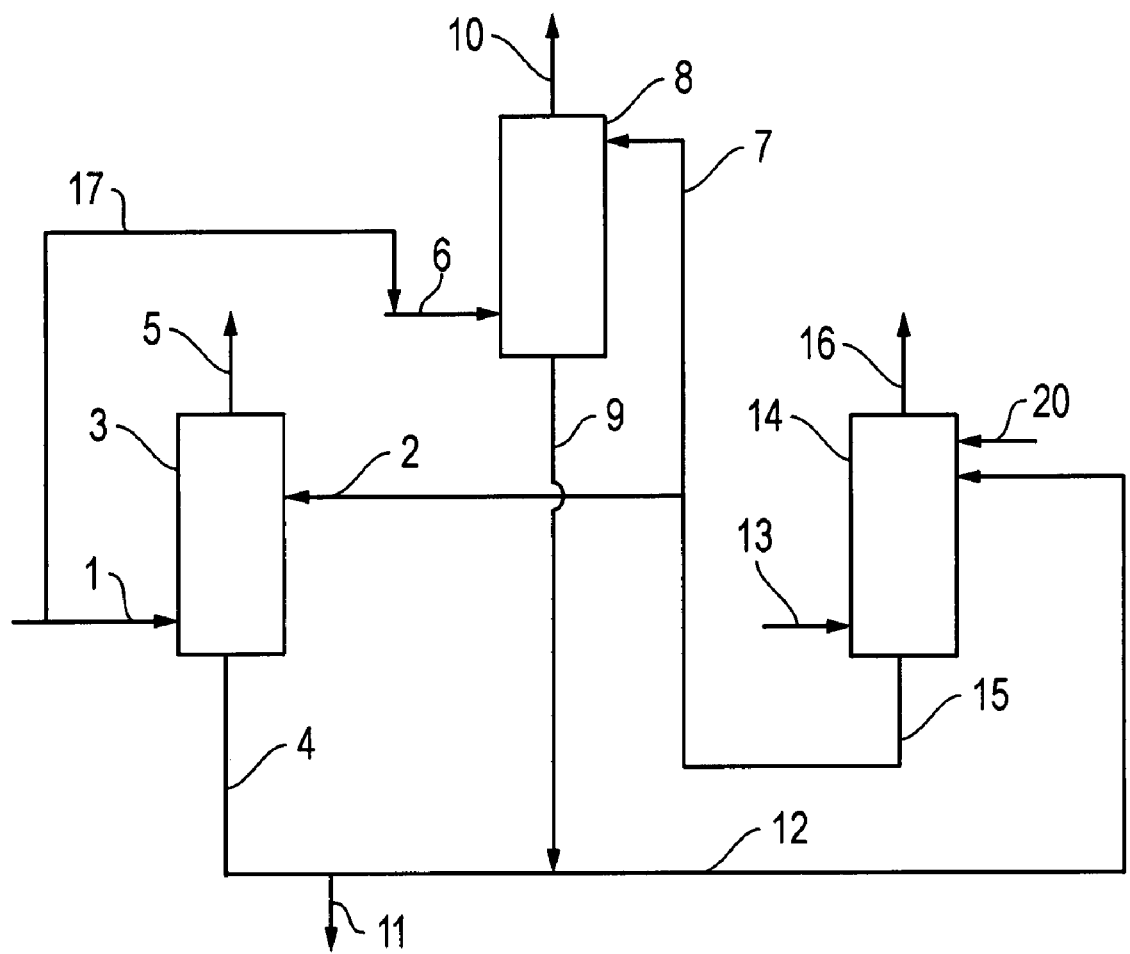
FIG. 1B and 1C are block diagrams for the process of production of ammonium thiosulfate, according to embodiments of the invention.

FIG. 1B depicts a block diagram for an alternative process according to an embodiment the invention. A portion 17 of the first gaseous feed stream 1 bypasses the first contact zone 3 and is fed to the second contact zone 8.

The bypass allows the first liquid stream to contact less ammonia and hydrogen sulfide in the first contact zone than it would have if the entire first gaseous stream were sent to the first contact zone. When the first liquid stream contacts a large excess of ammonia and hydrogen sulfide it may form a small concentration of sulfide ion or elemental sulfur. Since a portion of the first contact zone effluent liquid stream 4 will be taken as the product liquid stream 11, it is desirable to eliminate sulfide ion and elemental sulfur from the first contact zone effluent liquid stream 4. The bypass 17 may therefore be modulated to control the concentration of sulfite remaining in the first contact zone effluent liquid stream to a low but non-zero value or to reduce the concentration of sulfide ion or elemental sulfur remaining in the first contact zone effluent liquid stream.

Referring now to FIG. 2, a third portion 21 of the third contact zone effluent liquid stream 15 may be added to the product liquid stream 11 to convert any sulfide or elemental sulfur in the product liquid stream 11 to thiosulfate and provide a residual amount of sulfite to assure that the product liquid stream 11 may contain no or negligible amounts of sulfide or sulfur.

Additionally, the flow rate of the third portion 21 can be controlled in response to sulfite concentration of the product liquid stream 11. The sulfite concentration may be measured by an in-line oxidation potential analyzer or by an infrared analyzer.

As previously stated, the third contact zone effluent may be divided between the first contact zone 3 and the second contact zone 8, and the liquid effluent 9 of the second contact zone 8 is returned to the third contact zone 14 so that the product stream 11 contains none of the effluent liquid 9 directly from the second contact zone. Therefore, the pH and flow of the second liquid stream 7 may be controlled so that the sulfite concentration of the second contact zone effluent liquid stream 9 is substantially higher than the sulfite concentration desirable in the product liquid stream 11. To ensure that effectively all the ammonia fed to the second contact zone is absorbed into the liquid, the pH in the second contact zone is controlled. In one embodiment, the process of this invention comprises setting the flow rate of the second liquid stream 7 high enough so that the pH in the second contact zone effluent liquid stream 9 remains below about 7.0. The pH of the liquid effluent 15 from the third contact zone 14 is controlled in the range 5.7 to 7.5 so that ammonia is readily absorbed into the liquid in the second contact zone 8. The pH in the liquid streams may be measured with a pH meter.

Modulating the flow rate and pH of the second liquid stream limits the absorption of $H_2S$ in the second contact zone. The molar ratio of sulfite ions in the second liquid stream 7 to moles of $H_2S$ absorbed in the second contact zone must be sufficiently greater than two so that the second contact zone effluent liquid stream 9 contains a molar flow of sulfite ions greater than the moles of $SO_2$ to be absorbed in the third contact zone 14 by the reaction:

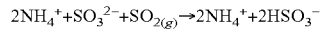

$$2NH_4^+ + SO_3^{2-} + SO_{2(g)} \rightarrow 2NH_4^+ + 2HSO_3^-$$

The presence of excess sulfite ions in the second contact zone precludes the existence of elemental sulfur in the solution.

Due to the buffering effect of its high residual sulfite concentration compared to liquid from the first contact zone, the effluent liquid stream 9 from the second contact zone can carry a substantially higher concentration of free ammonium ions than the first contact zone effluent liquid stream 4. The concentration of "free" ammonium ions in this context means the total moles of ammonium ions present less two times the moles of thiosulfate ions. Higher concentration of free ammonium ions increases the capacity of the solution to dissolve $SO_2$. Therefore, the second contact zone effluent liquid stream 9 is effective at reducing the concentration of $SO_2$ in the third gaseous feed stream 13 with lower circulation rates than would be required if the liquid used to absorb $SO_2$ had to meet the composition objectives of the liquid 4 from the first contact zone.

In another embodiment, the process of this invention comprises selecting the extent of contact of the second liquid stream 7 with the second gaseous feed stream 6 in the second contacting zone 8. This is done to control the process so that essentially all the ammonia in the second gaseous feed stream 6 is absorbed while the absorption of hydrogen sulfide in the second contact zone 8 is less than about one third of the total moles of ammonia absorbed in both the first contact zone and the second contact zone combined. Selecting the extent of contact in the second contact zone 8 involves designing the second contact zone 8 with enough pressure drop, circulation rate, trays or packing material, or other properties known in the art that the desired ratio is reached. One such system uses a column containing two to six valve trays and a ratio of second liquid stream 7 flow rate to ATS product stream 11 flow rate in the range of 25 to 50.

In another embodiment, the process comprises influencing the ratio of the absorption of ammonia from the second gaseous feed stream 6 to the absorption of hydrogen sulfide from the second gaseous feed stream 6 by modulating the temperature in the second contacting zone 8. This can be accomplished by adding or removing heat from the second liquid stream 7 using any heat exchange method known in the art. Increasing the temperature in the second contact zone 8 decreases the rate of absorption of ammonia relative to the rate of absorption of hydrogen sulfide.

In yet another embodiment, the process comprises modulating the ratio of absorption of ammonia from the second gaseous feed stream 6 to the absorption of hydrogen sulfide from the second gaseous feed stream 6 by controlling the pH within the third contact zone 14. The pH level may be measured with an inline pH meter.

The pH level within the third contact zone 14 may be controlled by controlling the amount of sulfur dioxide added to the third contact zone 14 in the third gaseous feed stream 13. The amount of sulfur dioxide in the third gaseous feed stream 13 may be controlled by modulating the amount of sulfur-containing compounds fed to the oxidation system 29, which produces the sulfur dioxide fed to the third contact zone.

Alternatively, the pH within the third contact zone 14 may controlled by modulating the amount of ammonia supplied to the process. The amount of ammonia supplied to the process may be controlled by controlling the flow of the first or second gaseous feed streams 1 or 6 or by modulating the supply of an ammonia-containing stream 9 to the third contact zone 14.

Figure 1C:
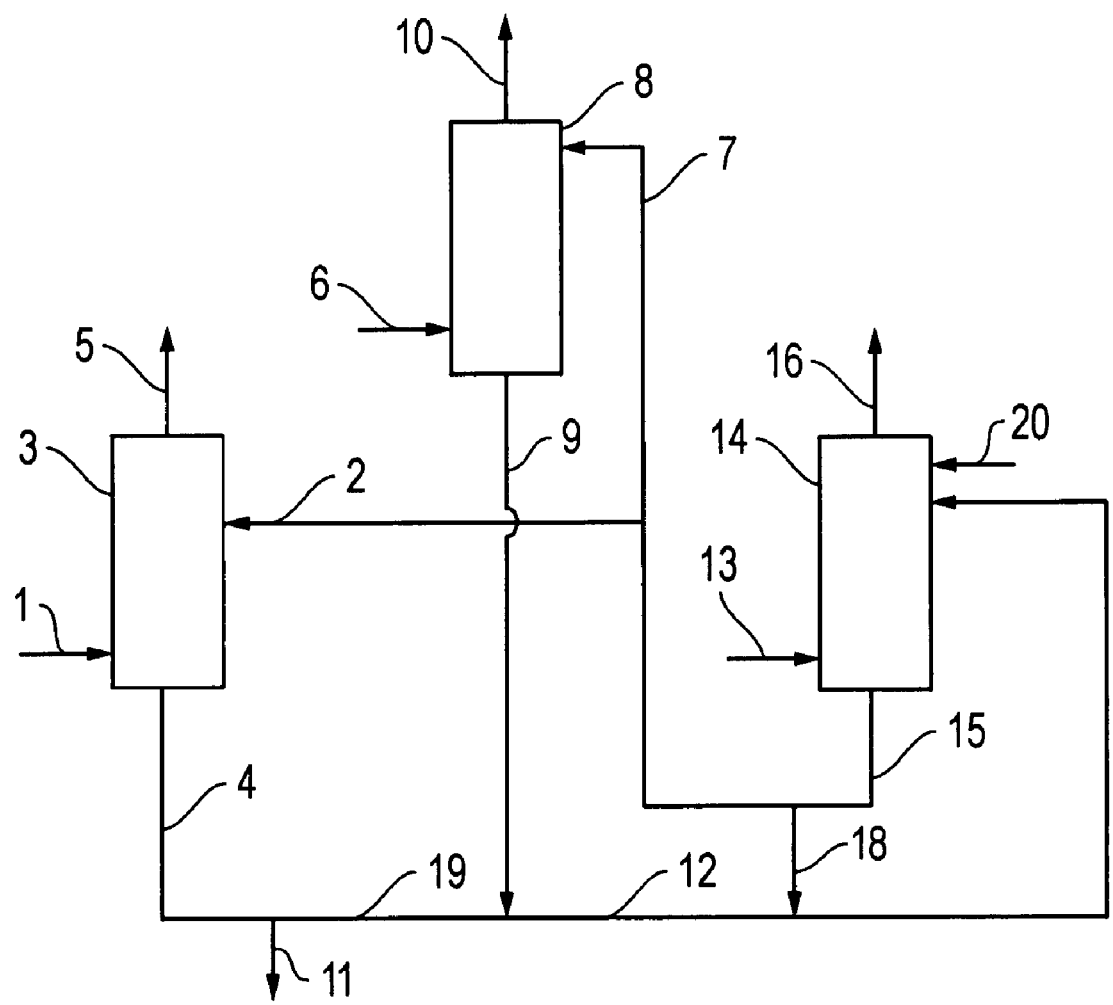

Referring now to FIG. 1C., an alternate embodiment of the process is shown. The embodiment comprises maintaining a ratio of the flow rate of the third liquid stream 12 to the amount of $SO_2$ to be absorbed in the third contact zone 14.

One method of maintaining this ratio involves bypassing both the first contact zone 3 and second contact zone 8 with at least a portion 18 of the third contact zone effluent liquid stream 15 and combining the bypassing portion 18 with the third liquid stream 12.

Further, the flow rate of the bypassing portion 18 of the third contact zone effluent liquid stream 15 may be modulated to make up the difference between the desired flow rate of the third liquid stream 12 and the combined flow rates of the second portion of the first contact zone effluent liquid stream 19 and the second contact zone effluent liquid stream 9, both of which may be controlled as previously described. The flow rate of liquid to the third contact zone is selected to reduce the concentration of $SO_2$ in the third contact zone overhead gas 16 to a desired value.

Because water lost from the process through the product liquid stream and the vent gas 16 may exceed the water included in feed gas streams 1, 6, and 13, it may be necessary to add makeup water to the process to maintain the water concentration in the product solution. In one embodiment, the makeup water 20 is added to the third contact zone 14. The rate of addition of makeup water 20 may be modulated in response to the density of the product liquid stream 11. The density of the product liquid stream 11 may be measured with a Coriolis-type mass flow meter.

Alternatively, or in addition to adding makeup water, the third contact zone overhead gas stream 16 may be cooled to condense water from the gas. The condensed water may be returned to the third contact zone 14 to supply at least a portion of the makeup water required.

In still another embodiment, the process comprises removing elemental sulfur deposits from process equipment from other sulfur recovery processes by contacting the elemental sulfur with a portion of the third contact zone effluent stream 15. The temperature of contact may be between about 70° F. and about 180° F. The elemental sulfur deposits are converted to thiosulfate ions by reaction with the sulfite ions in the solution from stream 15. The resulting solution may be returned to the third liquid stream 12. The removal of elemental sulfur from equipment is applicable to processes such as a Claus or a Claus tail gas treating process.

Referring again to FIG. 2, in another embodiment of the process, the third contact zone overhead gas stream 16 is treated in a fourth contact zone 22 to reduce the concentration of ammonia and sulfur dioxide in the fourth contact zone overhead gas stream 25.

This embodiment comprises feeding the third contact zone overhead gas stream 16 to the fourth contact zone 22 where the third contact zone overhead gas stream 16 is contacted with a fourth liquid stream 23 to produce a fourth contact zone effluent liquid stream 24 and a fourth contact zone overhead gas stream 25. The fourth contact zone effluent liquid stream 24 is returned to the third contact zone 14. The fourth liquid stream 23 may comprise either water or a dilute solution of ammonium sulfite and ammonium bisulfite.

The fourth contact zone 22 reduces the concentration of ammonia in the third contact zone overhead gas stream 16 to a few ppm and the concentration of $SO_2$ in the gas to less than about 100 ppm. The fourth contact zone overhead gas stream 25 contains no $H_2S$, an insignificant concentration of ammonia, and <100 ppm $SO_2$. From the fourth contact zone 22, the overhead gas 25 passes to either a vent to the atmosphere, or, if it also contains CO, to an incinerator, the firebox of a fired heater, or another suitable device for safe venting.

Ammonia may also be added to the fourth contact zone 22 to reduce the concentration of $SO_2$ in the fourth contact zone overhead gas stream 25. The amount of ammonia added to the fourth contact zone may be modulated in response to the pH of the liquid within the fourth contact zone.

In an additional embodiment, the amount of sulfur dioxide in the third gaseous feed stream 13 or the amount of ammonia supplied to the process is controlled in response to the pH of the liquid within the fourth contact zone 22 because that pH is an indicator of the pH in the liquid effluent 15 from the third contact zone 14. The concentrations of $NH_3$ and $SO_2$ in gas stream 16 are in equilibrium with the liquid it has contacted in the third contact zone 14. Both species dissolve readily in the aqueous solution in the fourth contact zone 22 and the pH of the resulting solution therefore reflects the relative concentrations of ammonia and sulfite in the solution in the third contact zone 14, which in turn determine the pH of that solution. The pH of that solution, as described above, affects the rates of absorption of $NH_3$ and $H_2S$ in the second contact zone.

Rather than adding makeup water to the third contact zone, the makeup water may be added to the fourth contact zone 22. The makeup water will be included in the fourth contact zone effluent liquid stream 24 and fed to the third contact zone 14.

The makeup water may be supplied in part from an external source and/or in part by condensing some of the water vapor from the third contact zone overhead gas stream 16 entering the fourth contact zone 22. Condensation may be achieved by any conventional means, including withdrawing a liquid stream from the fourth contact zone 22, cooling it, and returning it to the fourth contact zone 22. Alternatively, the fourth contact zone overhead gas stream 25 may be cooled in a heat exchanger, such as an air-fin exchanger, and the condensate formed by the cooling returned to the fourth contact zone 22.

In an additional embodiment, the process comprises reducing the concentration of hydrogen sulfide in an external fluid stream 26, which is immiscible with water, by contacting the external fluid stream 26 with a fourth portion 27 of the third contact zone effluent liquid stream 15 in a fifth contact zone 28. The external fluid stream 26 may be a liquid or a gas and may comprise hydrogen, hydrocarbons, nitrogen, argon, CO, $CO_2$, or combinations thereof.

The sulfite in the third contact zone effluent liquid stream 15 reacts with $H_2S$ to form ammonium thiosulfate but does not react with the other components of the external fluid stream 26. Contacting the external fluid stream 26 with the third contact zone effluent liquid stream 15 therefore removes $H_2S$ while leaving the other components in the external gas stream. This process is advantageous over other $H_2S$ removal processes, such as amine treatment, because $CO_2$ does not compete with $H_2S$ in reacting with the sulfite. Therefore, $H_2S$ can be readily and selectively removed from streams containing $CO_2$.

The sulfur dioxide supplied to the third gaseous feed stream 13 may be supplied from any suitable source. An oxidation system 29 is one example of an acceptable sulfur dioxide source. In an oxidation system, hydrogen sulfide and any other sulfur containing compounds are burned to produce $SO_2$.

In one embodiment, the process comprises feeding to the oxidation system 29 a gas 30 comprising sulfur in such forms as $H_2S$, COS, $CS_2$, sulfur vapor, mercaptans, disulfides, and mixtures thereof. The gas 30 may be comprised of one or more of the following: the first contact zone overhead gas stream 5, the second contact zone overhead gas stream 10, a stream of concentrated $H_2S$ from an acid gas extraction unit such as an amine unit, a tail gas from a Claus process, portions thereof, or combinations thereof.

In one embodiment of the oxidation system 29, the sulfur compounds are oxidized in two stages to avoid the formation of $SO_3$. In the first stage, the gas is burned with a substoichiometric amount of oxygen in a burner at temperatures above 1400° F. A substoichiometric amount of oxygen is less oxygen than would be chemically required to burn all the sulfur atoms to $SO_2$. In some embodiments, this leaves between about 0.1% and about 5% of the sulfur unoxidized. In the second stage, the remaining reduced sulfur is oxidized with excess oxygen at a relatively low temperature, between about 500° F. and 900° F., over a commonly-available catalyst that does not catalyze oxidation to $SO_3$. An example of such a catalyst is Criterion 099, available from Criterion Catalysts & Technologies of Houston, Tex. As a result of the two stage oxidation system, the oxidized gas is essentially free of $SO_3$ that would contaminate the ATS product and pose a risk of corrosion if the gas contacts a cold spot on the equipment walls.

In one embodiment, a portion of the sulfur-containing gas burned in the oxidation system is supplied from the tail gas of a Claus process. The Claus process is a well known sulfur-recovery process. The tail gas of a Claus process contains a variety of sulfur-containing compounds, including $SO_2$, $H_2S$, $S_2$, COS, and $CS_2$.

In another embodiment, the Claus tail gas is mixed with hot effluent gas from the burner and fed to the catalytic oxidation reactor.

In another embodiment, the Claus tail gas is sent to the third contact zone 14 without first being oxidized or reduced. Oxidation or reduction of the Claus tail gas is obviated because the process of this invention has the ability to convert $H_2S$, elemental sulfur, and $SO_2$ into thiosulfate. The majority of the sulfur in Claus tail gas is in the form of these three species.

Preferred processes and apparatus for practicing the present invention have been described. It will be understood and readily apparent to the skilled artisan that many changes and modifications may be made to the above-described embodiments without departing from the spirit and the scope of the present invention. The foregoing is illustrative only and that other embodiments of the integrated processes and apparatus may be employed without departing from the true scope of the invention defined in the following claims.

The invention claimed is:

1. A process for producing ammonium thiosulfate comprising:
   (a) contacting, in a first contact zone, a first gaseous feed stream comprising ammonia and hydrogen sulfide with a first liquid stream comprising ammonium thiosulfate and ammonium sulfite, wherein a portion of the ammonium sulfite is converted to ammonium thiosulfate upon contact with the first gaseous feed stream,
      the first contact zone producing a first contact zone effluent liquid stream comprising ammonium thiosulfate and a first contact zone overhead gas stream comprising hydrogen sulfide and ammonia;
   (b) contacting, in a second contact zone, a second gaseous feed stream comprising ammonia and hydrogen sulfide with a second liquid stream comprising ammonium thiosulfate and ammonium sulfite, wherein a portion of the ammonium sulfite is converted to ammonium thiosulfate upon contact with the second gaseous feed stream,
      the second contact zone producing
         a second contact zone effluent liquid stream comprising ammonium thiosulfate and ammonium sulfite with a sufficient concentration of sulfite to act as a buffer to keep the pH low enough to dissolve essentially all of the ammonia from the second gaseous feed stream and
         a second contact zone overhead gas stream comprising hydrogen sulfide and essentially free of ammonia,
   (c) removing a first portion of the first contact zone effluent liquid stream to form a product liquid stream;
   (d) combining the second contact zone effluent liquid stream with a second portion of the first contact zone effluent liquid stream to produce a third liquid stream;
   (e) contacting the third liquid stream with a third gaseous feed stream comprising sulfur dioxide in a third contact zone, wherein a portion of the sulfur dioxide is converted to ammonium sulfite upon contact with the third liquid stream, the third contact zone producing a third contact zone effluent liquid stream
      comprising ammonium thiosulfate and ammonium sulfite and a third contact zone overhead gas stream comprising ammonia and sulfur dioxide;
   (f) feeding a first portion of the third contact zone effluent liquid stream to the first contact zone as the first liquid stream; and
   (g) feeding a second portion of the third contact zone effluent liquid stream to the second contact zone as the second liquid stream.

2. The process of claim 1, further comprising modulating the flow rate of the first liquid stream to control the concentration of sulfite ions in the third liquid stream.

3. The process of claim 1, further comprising adjusting the intensity of gas-liquid contact in the first contact zone, wherein the intensity is adjusted so that the first contact zone liquid effluent stream does not comprise sulfide.

4. The process of claim 1, wherein the first contact zone liquid effluent stream is essentially free of sulfide or elemental sulfur.

5. The process of claim 1, wherein the second gaseous feed stream comprises at least a portion of the first contact zone overhead gas stream.

6. The process of claim 1, further comprising controlling the flow rate of the second liquid stream to maintain the pH in the second contact zone effluent liquid stream below about 7.0.

7. The process of claim 1, wherein the pH within the third contact zone is controlled by modulating the amount of sulfur dioxide added to the third contact zone.

8. The process of claim 1, wherein the pH within the third contact zone is controlled by modulating the total amount of ammonia supplied to to the first contact zone, the second contact zone, or the third contact zone.

9. The process of claim 1, further comprising maintaining a ratio of the flow rate of the third liquid stream to the amount of ammonia absorbed in the first contact zone and second contact zone, so that the third liquid stream contains at least as many moles of sulfite ($SO_3^{-2}$) ions as the number of moles of sulfur dioxide to be absorbed in the third contact zone.

10. The process of claim 1, further comprising adding makeup water to the third contact zone, wherein rate of addition of makeup water is modulated in response to the density of the product liquid stream.

11. The process of claim 1, further comprising feeding the third contact zone overhead gas stream to a fourth contact zone where the third contact zone overhead gas stream is contacted with a fourth liquid stream to produce a fourth contact zone effluent liquid stream and a fourth contact zone overhead gas stream.

12. The process of claim 11, wherein the fourth liquid stream comprises either water or a dilute solution of ammonium sulfite.

13. The process of claim 11, wherein the amount of sulfur dioxide in the third gaseous feed stream is controlled in response to the pH of the liquid within the fourth contact zone.

14. The process of claim 11, wherein amount of ammonia supplied to the process is controlled in response to the pH of the liquid within the fourth contact zone.

15. The process of claim 1, further comprising reducing the concentration of hydrogen sulfide in an external fluid stream immiscible with water by contacting the external fluid stream with a fourth portion of the third contact zone effluent liquid stream in a fifth contact zone.

16. A process for producing ammonium thiosulfate comprising:
(a) contacting, in a first contact zone, a first gaseous feed stream comprising ammonia and hydrogen sulfide with a first liquid stream comprising ammonium thiosulfate and ammonium sulfite, wherein a portion of the ammonium sulfite is converted to ammonium thiosulfate upon contact with the first gaseous feed stream,
the first contact zone producing a first contact zone effluent liquid stream comprising ammonium thiosulfate and a first contact zone overhead gas stream comprising hydrogen sulfide and ammonia;
(b) contacting, in a second contact zone, a second gaseous feed stream comprising ammonia and hydrogen sulfide with a second liquid stream comprising ammonium thiosulfate and ammonium sulfite, wherein a portion of the ammonium sulfite is converted to ammonium thiosulfate upon contact with the second gaseous feed stream,
the second contact zone producing a second contact zone effluent liquid stream comprising ammonium thiosulfate and ammonium sulfite and a second contact zone overhead gas stream comprising hydrogen sulfide and essentially free of ammonia;
(c) removing a first portion of the first contact zone effluent liquid stream to form a product liquid stream;
(d) combining the second contact zone effluent liquid stream with a second portion of the first contact zone effluent liquid stream to produce a third liquid stream;
(e) contacting the third liquid stream with a third gaseous feed stream comprising sulfur dioxide in a third contact zone, wherein a portion of the sulfur dioxide is converted to ammonium sulfite upon contact with the third liquid stream,
the third contact zone producing a third contact zone effluent liquid stream comprising ammonium thiosulfate and ammonium sulfite and a third contact zone overhead gas stream comprising ammonia and sulfur dioxide;
(f) feeding a first portion of the third contact zone effluent liquid stream to the first contact zone as the first liquid stream;
(g) feeding a second portion of the third contact zone effluent liquid stream to the second contact zone as the second liquid stream,
(h) feeding the third contact zone overhead gas stream to a fourth contact zone, wherein the third contact zone overhead gas stream is contacted with a fourth liquid stream, producing a fourth contact zone liquid effluent stream and a fourth contact zone overhead gas stream; and
(i) adding makeup water to the fourth contact zone.

17. The process of claim 16, wherein the fourth contact zone overhead gas stream is essentially free of ammonia, does not comprise hydrogen sulfide and comprises less than 100 ppm sulfur dioxide.

18. The process of claim 16, further comprising controlling the flow rate of the second liquid stream to maintain the pH in the second contact zone effluent liquid stream below about 7.0.

19. The process of claim 16, wherein a portion of the makeup water to the fourth contact zone is supplied by condensing water from the fourth contact zone overhead gas.

20. The process of claim 16, further comprising maintaining a ratio of the flow rate of the third liquid stream to the amount of ammonia absorbed in the first contact zone and second contact zone, so that the third liquid stream contains at least as many moles of sulfite ($SO_3^{-2}$) ions as the number of moles of sulfur dioxide to be absorbed in the third contact zone.

21. The process of claim 16, wherein the pH within the fourth contact zone is controlled by modulating the amount of ammonia added to the process.

22. A process for producing ammonium thiosulfate comprising:
(a) contacting, in a first contact zone, a first gaseous feed stream comprising ammonia and hydrogen sulfide with a first liquid stream comprising ammonium thiosulfate and ammonium sulfite, wherein a portion of the ammonium sulfite is converted to ammonium thiosulfate upon reaction with the first gaseous feed stream,
the first contact zone producing a first contact zone effluent liquid stream comprising ammonium thiosulfate and a first contact zone overhead gas stream comprising hydrogen sulfide and ammonia;
(b) contacting, in a second contact zone, a second gaseous feed stream comprising ammonia and hydrogen sulfide with a second liquid stream comprising ammonium thiosulfate and ammonium sulfite wherein a portion of the ammonium sulfite is converted to ammonium thiosulfate upon reaction with the second gaseous feed stream, the second contact zone producing a second contact zone effluent liquid stream comprising ammonium thiosulfate and ammonium sulfite with a sufficient concentration of sulfite to act as a buffer to keep the pH low enough to dissolve essentially all of the ammonia from the second gaseous feed stream and a second contact zone overhead gas stream comprising hydrogen sulfide and essentially free of ammonia;

(c) removing a first portion of the first contact zone effluent liquid stream to form a product liquid stream;

(d) combining the second contact zone effluent liquid stream with a second portion of the first contact zone effluent liquid stream to produce a third liquid stream;

(e) contacting the third liquid stream with a third gaseous feed stream comprising sulfur dioxide in a third contact zone, wherein a portion of the sulfur dioxide is converted to ammonium sulfite upon reaction with the third liquid stream, the third contact zone producing a third contact zone effluent liquid stream comprising ammonium thiosulfate and ammonium sulfite and a third contact zone overhead gas stream comprising ammonia and sulfur dioxide;

(f) feeding a first portion of the third contact zone effluent liquid stream to the first contact zone as the first liquid stream; and (g) feeding a second portion of the third contact zone effluent liquid stream to the second contact zone as the second liquid stream, (h) feeding the third contact zone overhead gas stream to a fourth contact zone, wherein the third contact zone overhead gas stream is contacted with a fourth liquid stream, producing a fourth contact zone liquid effluent stream and a fourth contact zone overhead gas stream;

(i) adding makeup water to the fourth contact zone.

23. The process of claim 22, further comprising adjusting the intensity of the gas-liquid contact in the first contact zone, wherein the intensity is adjusted so that the first contact zone effluent liquid does not comprise sulfide.

24. The process of claim 22, wherein the first contact zone liquid effluent is essentially free of sulfide or elemental sulfur.

25. The process of claim 22, wherein the fourth contact zone overhead gas stream is essentially free of ammonia, does not comprise hydrogen sulfide and comprises less than 100 ppm sulfur dioxide.

* * * * *